(12) United States Patent
Royle

(10) Patent No.: US 6,647,910 B1
(45) Date of Patent: Nov. 18, 2003

(54) WAVE SHOCK ABSORBER SYSTEM

(76) Inventor: Ian Arthur Royle, 11700 Dover St., Houston, TX (US) 77031

( * ) Notice: Subject to any disclaimer, the term of this patent is extended or adjusted under 35 U.S.C. 154(b) by 0 days.

(21) Appl. No.: 09/951,603

(22) Filed: Sep. 13, 2001

Related U.S. Application Data

(60) Provisional application No. 60/232,545, filed on Sep. 14, 2000.

(51) Int. Cl.$^7$ ................................................ B63B 1/34
(52) U.S. Cl. ...................................... 114/67 R; 405/21
(58) Field of Search ........................... 114/67 R, 67 A; 405/21–23, 25–31, 215

(56) References Cited

U.S. PATENT DOCUMENTS

| | | | | |
|---|---|---|---|---|
| 743,171 A | * | 11/1903 | Jamieson | .................. 114/67 R |
| 1,195,857 A | * | 8/1916 | Royston | ..................... 114/219 |
| 1,591,748 A | * | 7/1926 | Dieckmann | ............... 114/67 A |
| 3,288,236 A | * | 11/1966 | Padial | ........................ 114/284 |
| 3,981,260 A | * | 9/1976 | Hilbig | ..................... 114/67 R |

* cited by examiner

Primary Examiner—Jesus D. Sotelo

(57) ABSTRACT

This invention relates to methods for absorbing impacting shock loads from waves on marine hulls by using a diffuser to provide a reduced impact zone forward of the hull and to divide the wave and cause the non-compressible liquid of the wave to mix with air in the diffuser channels to form a compressible fluid to further absorb impacting shock loads. This system was invented to provide for wave shock absorption of wide bow flat-bottomed marine hulls. These hulls being more buoyant and stable, provided more usable space, while possessing very efficient planing hulls that are easier to manufacture than three dimensional pointed bow hulls.

1 Claim, 4 Drawing Sheets

PRINCIPLE OF DIFFUSER BOW

DIFFUSER PROVIDES AIR CHANNELS TO LESSEN IMPACT
THROUGH COMPRESSION OF AIR AND WATER MIXTURE
AND REDUCTION OF SUCTION ON HULL

BUOYANCY STABILITY USABLE SPACE

DISPLAYS
LOW BUOYANCY
LOW STABILITY
LIMITED SPACE

NEW INVENTION DISPLAYS
HIGH BUOYANCY
HIGH STABILITY
MAXIMUM SPACE
PROVIDED BY WIDE DIFFUSER BOW

ENERGY LOSSES - INERTIA

WAVE SHOCK ABSORBER SYSTEM

This is a "Non-Provisional" Patent Application which must be filed no later than twelve months from the filing date of "Provisional" Patent Application Ser. No. 60/232,545, filed Sep. 14, 2000. This application claims the; benefit of U.S. Provisional Application No. 60/232,545, filed Sep. 14, 2000.

BACKGROUND OF THE INVENTION

(1) Technical Field

This invention relates to methods for absorbing impacting shock loads from waves by using a diffuser to provide a reduced impact zone forward of the hull and to divide the wave and cause the non-compressible liquid of the wave to mix with air in the diffuser channels to form a compressible fluid to further absorb impacting shock loads. The system was invented to provide for wide bow craft allowing high buoyancy high stability, more usable space and a flat bottomed planing hull consistent with better method of manufacture higher strength and lower cost of manufacture of marine craft.

The invention also applies to absorbing impact loads from semi solids like snow that are undulating and would normally cause impact with the front of the sleds, skis or snowmobiles.

(2) Background Information

For thousands of years the bows of boats have been shaped typically to a point to reduce impact with waves from a concentrated impact to a gradual impact over a time span. The bow has been made in many forms including pointed, chamfered, bulbous, contoured, angled. The shape has limited the forward section of hulls in volume for practical use, causing costly construction.

The new invention decreases concentrated impact with waves providing absorption of the impact over a longer period of time. The invention provides shock absorption by presenting a multitude of surfaces with spaces between them being described as a diffuser to reduce the impact through applying the hull gradually to the force of the wave and by mixing the liquid with the air already between the plates of the diffuser to produce a compressible fluid to further absorb impact.

Two types of hulls dominate the marine industry. The first type is known as a displacement hull. When it floats, it must displace its own weight of water. When it moves, it must continue to displace its own weight of water to be able to travel. Obviously, the inertia of the water being displaced requires energy and to move quickly the inertia becomes impossible to overcome with a practical amount of propulsion energy. The displacement hull normally has a pointed or sharp bow to part the waves to allow progress.

The second type is a planing hull. At rest, it displaces its weight in water as with a displacement hull. However, it is a shallow draft, wider hull, and as it is propelled forward, it tends to rise up on the surface of the water and at the planing stage, it is no longer displacing water. Being a wide hull, it is difficult to operate when waves are present because of intolerable wave impact.

With this invention, the intended practical use of marine craft, that better accommodates people and goods is now possible. In regard to marine use, a further advantage of the diffuser hull version of the wave shock absorber systems is to add air to the diffuser fluid to form a compressible fluid to reduce impact on the hull and as a secondary product, to reduce suction between the water and hull thereby reducing drag. The diffuser can also be used on the stern of a hull to reduce suction during displacement running. Deployed shock absorber systems to disperse shock waves on aircraft surfaces are also possible using this invention.

The wave shock absorber hull, because it provides for wave impact control of a wide hull allows for a hull that is faster, more energy efficient, has high buoyancy (more seaworthy) high stability (less prone to capsize) uncompromised space availability. Manufacture of the wave shock absorber hull will solve many of the cost problems associated with present state of the art craft.

Manufacture of the wave shock absorber hull will solve many of the problems associated with the construction of displacement hulls. Displacement hulls must be built with continuous curving surfaces from stem to stern. These surfaces are all 3 dimensional. To try to compromise these laws reduces the efficiency of the displacement hull. A further problem is that the displacement hull can only be operated efficiently at the speed as designed. Therefore, each type of displacement hull is designed for its intended purpose and a narrow speed range. Each hull is a special purpose shape from a special purpose mold.

The shock absorber hull can be manufactured to any length and to any width, as there is NO FLUID DYNAMIC SHAPE RESTRICTION for OPERATION or EFFICIENCY. THERE IS NO NEED FOR CURVED SURFACES, GREATLY SIMPLIFYING MANUFACTURING COSTS and PRODUCT INTEGRITY.

MANUFACTURING BENEFITS:

(a) Simpler construction because of 2 dimensional shapes.

(b) Lower cost 'off the shelf' materials.

(c) Lower process costs for 'in-plant' manufacturing.

(d) Lower cost materials & process.

(e) Higher quality product through 2 dimension CONTINUOUS SECTION MATERIALS.

(f) Larger range of materials, particularly composites and metals.

(g) Lower product liability through 'off the shelf' or easily inspected wrought or composite mass produced materials.

(h) Much lower cost of production. Boosts marketability and profit margin.

THE INVENTION PROVIDES A VERY BROAD RANGE OF MARINE CRAFT AVAILABLE FROM ONE MANUFACTURING SOURCE, INCLUDING DEPARTMENT OF DEFENSE ORDERS FOR ASSAULT TROOP AND EQUIPMENT CARRIERS.

Benefits to users are greater safety through higher buoyancy, higher stability, higher structural integrity and higher floatation. The cost is lower because of simpler construction.

The high buoyancy hull provided by the wave shock absorber hull provides a very low draft which allows the craft to be deployed in shallow water, coral reefs, wetlands, etc. with minimal ecological disturbances. Present marine craft have deeper draft because of the limited floatation caused by the geometrical restriction of the bow.

Recap:

Provides for better shape for better efficiency use of rectangular space instead of rounded.

Provides housing for engine and amphibious gear because diffuser construction reinforces the bow to a higher strength level.

Provides more capacity for design appearance.

Provides plates or other shapes for heat exchanging to cool engines, engine coolant, and cool and disperse engine exhaust in the multiplicity of different plates and shapes at very little cost.

Provides the ability to mix gas with liquid to reduce impact and suction on the hull, to increase speed or decrease power necessary to drive hull.

Provides the bases for a flat bottom hull for maximum buoyancy and maximum planing capability, which leads to greater stability at rest.and at speed.

Provides better structural simplicity/flat sides, flat bottom, rectangular structure and parallel longitudinal shape not attainable with pointed bow.

The same system can be applied to the stern of craft to reduce the stern wave effect.

The shock absorber bow can be topped to keep fluids contained and forced down through the plates under the craft to provide further lift.

The present pointed bow wastes energy in forcing liquids sideways, producing a bow wave. This energy is lost to the sea. The shock absorber bow also controls and reduces spray and splashing on the craft.

Also, with this system it is convenient to locate the engine or engines in the bow which is a structural section of the boat, allowing the propulsion system to be forward of the craft in undisturbed water, reducing cavitation on the propulsion system (propellers), thereby providing a more efficient propulsion (tractor) system. In present stern drive systems, propellers are washed in gas dissolved or mixed in the water, decreasing power through cavitation, particularly in tunnel hulls.

By placing the propulsion system in the structural diffuser bow provides better structural integrity in the craft which in turns reduces construction costs and also provides modular construction. By replacing the higher percentage of weight in the bow also provides a better planing center of gravity position reducing considerably the stern wave production. The shock absorber bow is also in an ideal position to mount amphibious undercarriage, particularly for use on ramp retrieval.

The diffuser bow version with forward engine provides for an uncluttered transom which can also be used for entry and exit from the craft by lowering the transom.

Practicality of Shape:

The diffuser bow is very suitable for larger applications including a large flat rectangular floor [deck] for fishing, camping, and recreational water sport, being, of full width, full length, and predominantly square cornered, hull maximum stability and minimum draft is achieved also suitable for vehicle transport carrying. The diffuser bow is ideal for multi-hull craft where wide hulls are necessary for cabins and bulk carrying capacity, like containers or car ferries. The shock absorber bow is also very suitable for seaplane hulls and floats as they plane more readily than pointed, contoured or bulbous bow hulls and reduce spray and splash as a diffuser automatically collects and forces water and air water mixture downwards and not up or sideways to collect the mixture of air and water to free the bottom of the hull from suction providing takeoff with less power and a softer landing. The shock absorber bow is also suited to situations like water skis, snow skis or snowmobiles, to reduce this shock and resistance felt by the present turned up fronts and leading edges.

The diffuser bow and stern also has advantageous applications in seaplanes to reduce the leading edge shock.

The wave shock absorber principle can be used in present pointed, bulbous, or chamfered bows to improve shock absorption of wave forces. It is not restricted to squared bows. The shock absorber system can also be used in roofs, decktops or screens to reduce concentrated loads on these structures.

The shock absorber system can be served by the use of mesh screen and grating structures. The partition wall of diffuser can be angled, curved or reduced in section, width, or length to produce the desired deflection collection or dispersion of the fluid for best results in the particular application. For example, driving fluid down for better lift of the craft.

This density or spacing of the shock absorber structure need not be even in space across the shock absorber bow but can be varied to increase or decrease loads, for example greater loads can be taken at top or bottom of sides of a structure or wherever the structure is able to resist the load.

The shock absorber bow provides a better structure for architectural innovation, particularly the use of textures in metal surfaces for appearance, better sales of product through better aesthetics. For example, black to show a large intake popular in promoting aircraft type technology and the use of metal type finishes to promote quality and decorative finish integrity. The new bow has immediate application in barges to diffuse waves and even out velocity to reduce variations in speed thereby reducing losses through kinetic energy through acceleration and de-acceleration of the load. Further, the diffuser system can be below the hull line for protection of the hull or to take the downward mixture below leading edge of hull. The new system can also terminate above or at the waterline to reduce plate friction in some applications, for example, where hull is planing in smooth water (no wave formation) The invention can be used on the leading edge of the airfoil/hydrofoil to diffuse the shock load of the fluid and cause frictional load of the airfoil/hydrofoil. This diffuser system can be coarse or extremely fine towards the molecular side of the fluid. The Diffuser system can be applied to the walls/side/bottom/top of the hull structure to decrease side shocks of waves or similar forces of fluid and could also be used on the side or rear of fuselages or hulls to disperse low and high speed shock waves.

SUMMARY OF THE INVENTION

The invention comprises a plurality of forward facing surfaces with open spaces between them forming channels and a supporting structure to hold the surfaces in place. It is also an objective of the invention to provide for propulsion and house motors and land wheels in the diffuser bow because this is through necessity a high strength structural part of the hull.

It is also an objective of the invention to use the shock absorber for aesthetic improvement of the craft. It is also an objective of the invention to provide versions that can be deployed or particularly retracted to suit weather or impact conditions in liquid or gaseous applications (marine or aerospace).

DETAILED DESCRIPTION OF THE PREFERRED EMBODIMENTS

Referring to FIG. 1–FIG. 8.

Figure 1:
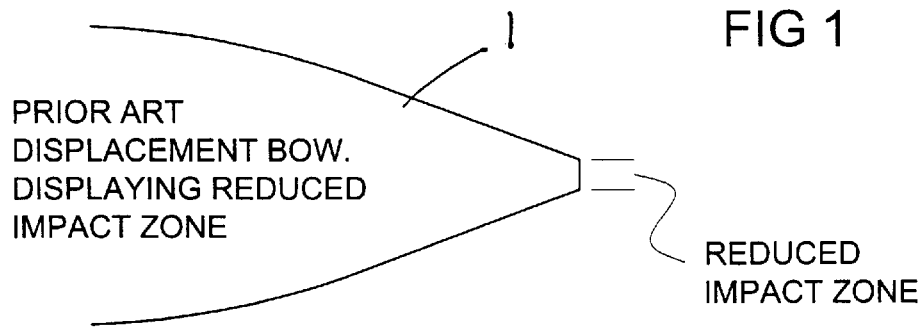
FIG. 1 illustrates the pointed displacement bow of the prior art.

FIG. 1 shows a plan view of the prior art of typical displacement bow 1 made pointed to reduce impact.

Figure 2:
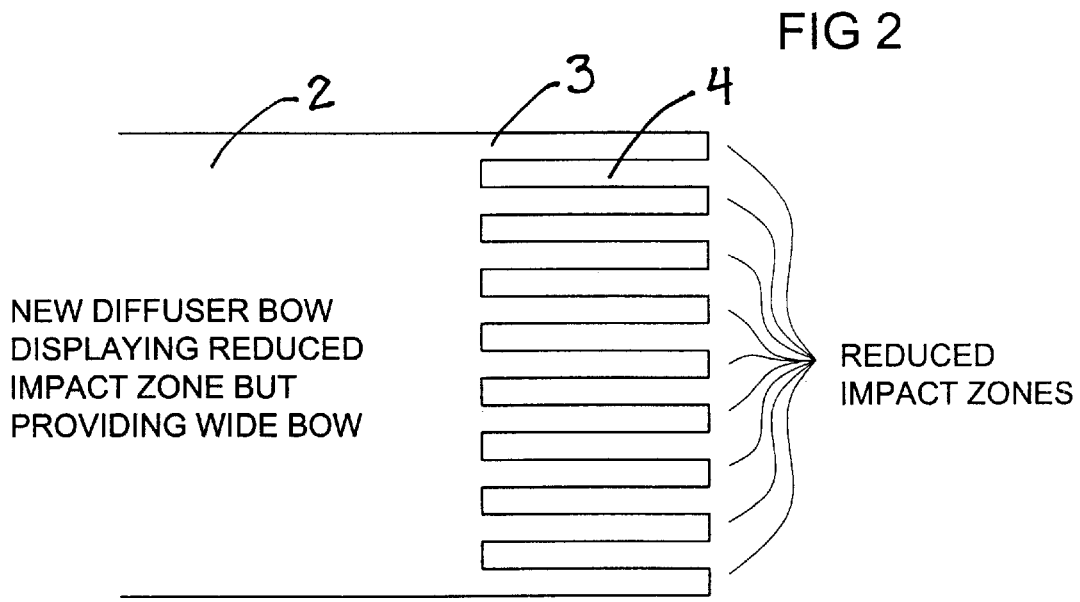
FIG. 2 illustrates the shock absorber hull (diffuser bow) showing the more usable shape.

FIG. 2 shows a plan view of the diffuser bow 2 having multiple plates 3 and channels 4 providing a diffuser structure. These channels provide for mixing air with the wave in the diffuser to provide a compressible fluid to reduce impact and reduce suction between the hull and the water.

Figure 3:
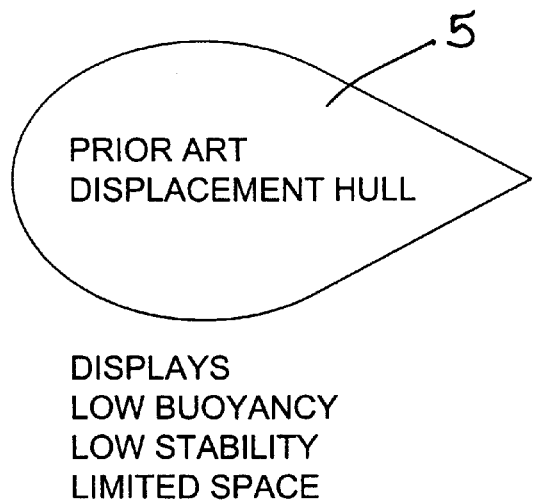
FIG. 3 illustrates the typical prior art displacement hull with its low buoyancy, low stability and limited space and illustrates the typical fluid dynamic shape required for a limited speed range.

FIG. 3 shows a plan view of the prior art of a typical displacement hull 5 with inherent low buoyancy, low stability, and limited usable space.

Figure 4:
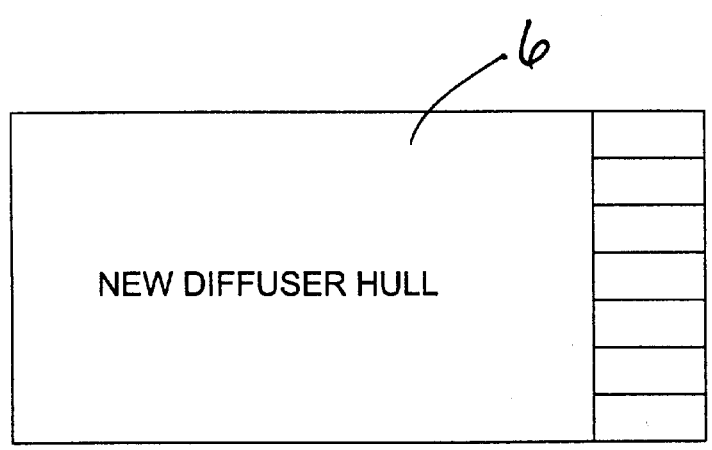
FIG. 4 illustrates the more useful shape of the shock absorber hull with its high buoyancy, high stability, and maximum space. This hull is also a planing hull, incorporating the advantages of the invention.

FIG. 4 shows a plan view of the diffuser hull 6 with inherent high buoyancy, high stability, and maximum usable space.

Figure 5:
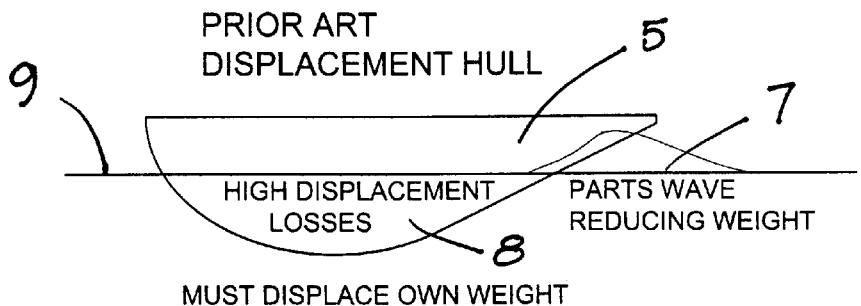
FIG. 5 further illustrates the prior art displacement hull, pointed bow and the high displacement losses.

FIG. 5 shows an elevation of a typical displacement hull 5 showing the wave 7 being parted on impact and showing the displacement 8 of the hull below the waterline 9.

Figure 6:
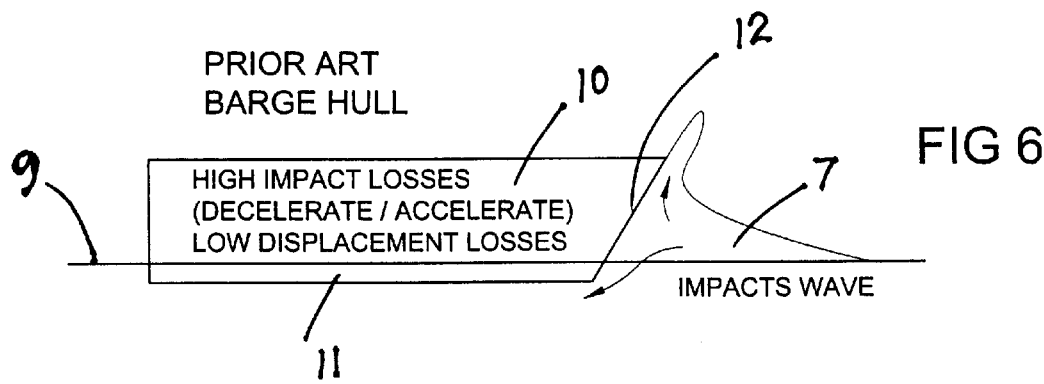
FIG. 6 illustrates the impact losses of the prior art wide bow barge type hull.

FIG. 6 shows an elevation of a typical barge hull 10 illustrating the low displacement 11 below the waterline 9 but shows the high impact losses caused by the wave 7 impacting the flat bow of the barge 12.

Figure 7:
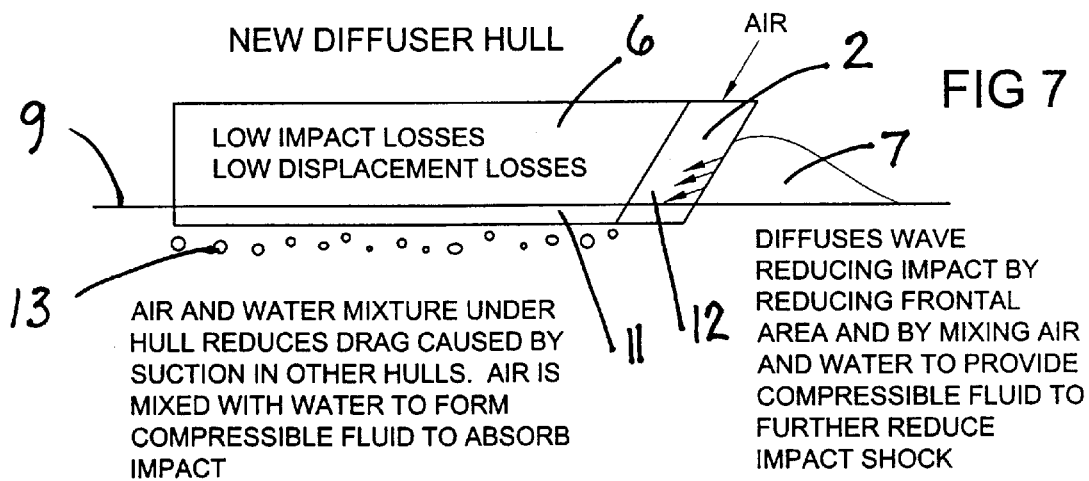
FIG. 7 illustrates the shock absorber hull with its low impact losses, low displacement losses and mixing of air with the wave in the diffuser to further reduce suction on the hull surfaces.

FIG. 7 shows an elevation of a diffuser hull 6 with its low displacement 11 below the waterline 9 providing the low displacement advantages of the barge hull 10, but with the reduces impact of the diffuser bow 2. Also shown is the diffused water mixed with air 12 that reduces impact due to the mixing of gas and liquid to form a compressible fluid and illustrates the secondary effect of the aerated liquid reducing suction between the hull and the water.

Figure 8:
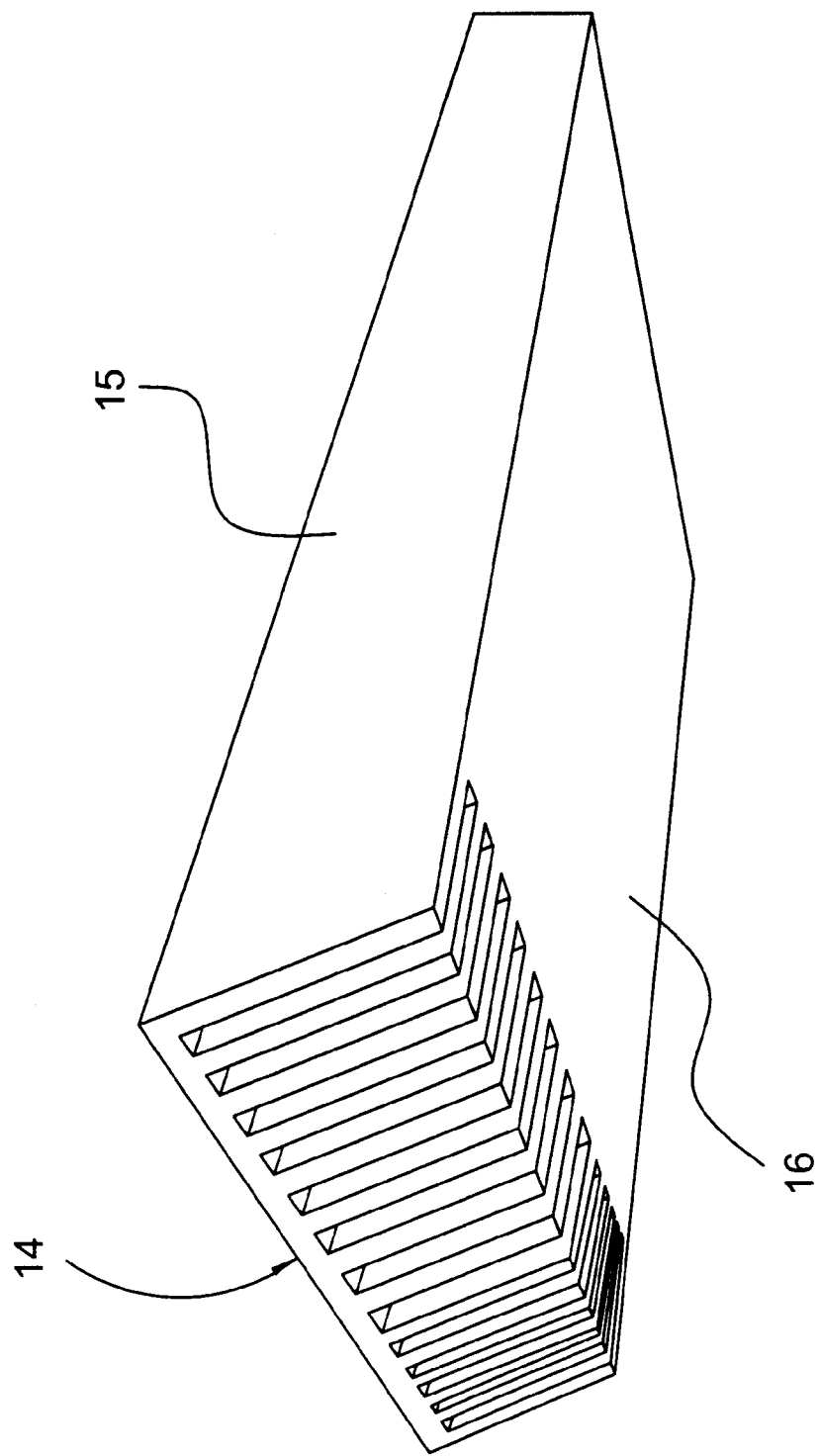
FIG. 8 illustrates the diffuser bow as built into a wide planing hull showing the simplicity of the new invention in this preferred embodiment version of the wave shock absorber system.

FIG. 8 shows an isometric view of the preferred embodiment showing the diffuser bow 14, side 15 and hull bottom 16.

What is claimed is:

1. In a marine vehicle having a hull provided with a bow, a wave shock absorbing diffuser system incorporating structural means for absorbing wave shock comprising a plurality of forwardly mounted sections of predetermined width and length and arranged in spaced relationship to each other providing vertical channels between the structural members on the bow to retard wave progression towards the hull by diffusing the waves.

* * * * *